(12) United States Patent
Okumura et al.

(10) Patent No.: US 8,098,253 B2
(45) Date of Patent: *Jan. 17, 2012

(54) DISPLAY UNIT AND METHOD FOR DISPLAYING MULTIPLE IMAGES

(75) Inventors: Tomohiro Okumura, Kariya (JP); Ryouichi Nishikawa, Nagoya (JP)

(73) Assignee: Denso Corporation, Kariya (JP)

( * ) Notice: Subject to any disclaimer, the term of this patent is extended or adjusted under 35 U.S.C. 154(b) by 594 days.

This patent is subject to a terminal disclaimer.

(21) Appl. No.: 12/078,988

(22) Filed: Apr. 9, 2008

(65) Prior Publication Data

US 2008/0266304 A1    Oct. 30, 2008

(30) Foreign Application Priority Data

Apr. 26, 2007  (JP) ................................. 2007-117548

(51) Int. Cl.
    *G06F 13/372*    (2006.01)
(52) U.S. Cl. ........ 345/530; 345/534; 345/537; 345/539; 715/807; 340/441
(58) Field of Classification Search .................. None
    See application file for complete search history.

(56) References Cited

U.S. PATENT DOCUMENTS

| | | | |
|---|---|---|---|
| 5,764,139 A | | 6/1998 | Nojima et al. |
| 5,854,628 A | * | 12/1998 | Nakagawa ............... 715/803 |
| 6,005,572 A | * | 12/1999 | Kurihara ................... 345/531 |
| 6,298,290 B1 | * | 10/2001 | Abe et al. .................... 701/35 |
| 7,821,387 B2 | * | 10/2010 | Okumura et al. ......... 340/461 |
| 2006/0244707 A1 | * | 11/2006 | Furihata et al. ............ 345/98 |
| 2008/0150709 A1 | * | 6/2008 | Yamamoto et al. ....... 340/441 |
| 2008/0258892 A1 | * | 10/2008 | Itoh et al. ................. 340/441 |

FOREIGN PATENT DOCUMENTS

| | | |
|---|---|---|
| JP | 2000-284942 | 10/2000 |
| JP | 2004-066989 | 3/2004 |
| JP | 2004-182092 | 7/2004 |
| JP | 2005-115107 | 4/2005 |

OTHER PUBLICATIONS

U.S. Application of Okumura et al; U.S. Appl. No. 12/078,987, filed Apr. 9, 2008.
Japanese Office Action dated Apr. 28, 2009, issued in corresponding Japanese Application No. 2007-117548, with English translation.

* cited by examiner

*Primary Examiner* — Kee M Tung
*Assistant Examiner* — Michelle Chin
(74) *Attorney, Agent, or Firm* — Nixon & Vanderhye P.C.

(57) ABSTRACT

A display unit includes: a display panel for displaying a plurality of information images; a memory for storing a plurality of image data elements corresponding to the information images; an image memory for storing the image data elements transferred from the memory; and a controller for controlling the display panel to display the information images based on the image data elements in the image memory. The controller transfers a part of the image data elements to the image memory on ahead when the display unit starts to operate, and the controller controls the display panel to display a part of information images on ahead based on the part of the image data elements.

18 Claims, 3 Drawing Sheets

DISPLAY UNIT AND METHOD FOR DISPLAYING MULTIPLE IMAGES

CROSS REFERENCE TO RELATED APPLICATIONS

This application is based on Japanese Patent Application No. 2007-117548 filed on Apr. 26, 2007, the disclosure of which is incorporated herein by reference. This application is also related to U.S. patent application Ser. NO. 12/078/987, entitled "DISPLAY UNIT AND METHOD FOR DISPLAYING IMAGE", filed on Apr. 9, 2008, which is now U.S. Pat. No. 7,821,387.

FIELD OF THE INVENTION

The present invention relates to a display unit and a method for displaying multiple images.

BACKGROUND OF THE INVENTION

A display for a vehicle is capable of displaying multiple images such as an information image showing a speed of the vehicle and an image showing the number of revolutions of an engine. For example, U.S. Pat. No. 5,764,139 discloses a display having a display panel made of liquid crystal. The panel includes multiple pixels, which provide a matrix system. The multiple images are shown on the panel.

A ROM stores an image data element corresponding to each information image. Multiple image data elements are transferred from the ROM to an image memory, and the image memory memorizes the multiple image data elements. Based on the image data elements in the image memory, multiple information images are shown on the panel. Since data capacity of each image data element is large, it takes much time to transfer and memorize the multiple image data elements from the ROM to the image memory. Accordingly, when the display starts to operate, a time interval, in which the display panel does not display anything, becomes long.

Thus, it is required to shorten the time interval when the display displays nothing in a case where the display starts to operate.

SUMMARY OF THE INVENTION

In view of the above-described problem, it is an object of the present disclosure to provide a display unit for displaying multiple images. It is another object of the present disclosure to provide a method for displaying multiple images.

According to a first aspect of the present disclosure, a display unit includes: a display panel for displaying a plurality of information images; a memory for storing a plurality of image data elements corresponding to the information images; an image memory for storing the image data elements transferred from the memory; and a controller for controlling the display panel to display the information images based on the image data elements in the image memory. The controller transfers a part of the image data elements to the image memory on ahead when the display unit starts to operate, and the controller controls the display panel to display a part of information images on ahead based on the part of the image data elements.

In the above unit, a time interval from start of operation of the unit to display of information is shortened. Thus, display performance of the unit is improved.

Alternatively, the plurality of information images may include a physical quantity information image, which represents physical quantity information. The physical quantity information image includes a scale image for providing a scale and a pointer image for providing a pointer, and the controller controls the display panel to display the physical quantity information image in such a manner that the pointer image is capable of moving along with the scale image.

According to a second aspect of the present disclosure, a display unit includes: a selector for selecting a first information image among a plurality of information images, wherein rest of the information images provides a second information image; a display panel for displaying the first information image and the second information image; a first memory for storing a first image data element and a second image data element, wherein the first image data element corresponds to the first information image, and the second image data element corresponds to the second information image; a second memory for storing the first and second image data elements transferred from the first memory, wherein the second memory provides an image memory; and a controller for controlling the display panel to display the first and second information images based on the first and second image data elements in the second memory. The controller transfers the first image data element from the first memory to the second memory when the display unit starts to operate. The controller controls the display panel to display the first information image corresponding to the first image data element. The controller transfers the second image data element from the first memory to the second memory after the display panel displays the first information image, and the controller controls the display panel to display the second information image corresponding to the second image data element.

In the above unit, a time interval from start of operation of the unit to display of information is shortened. Thus, display performance of the unit is improved.

According to a third aspect of the present disclosure, a method for displaying a plurality of information images includes: selecting a first information image among the plurality of information images, wherein rest of the information images provides a second information image; storing a first image data element and a second image data element in a first memory, wherein the first image data element corresponds to the first information image, and the second image data element corresponds to the second information image; transferring the first image data element from the first memory to a second memory after the selecting and the storing, wherein the second memory provides an image memory; displaying the first information image corresponding to the first image data element on a display panel; transferring the second image data element from the first memory to the second memory after the displaying the first information image; and displaying the second information image corresponding to the second image data element on the display panel.

In the above method, a time interval from start of operation to display of information is shortened. Thus, display performance is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
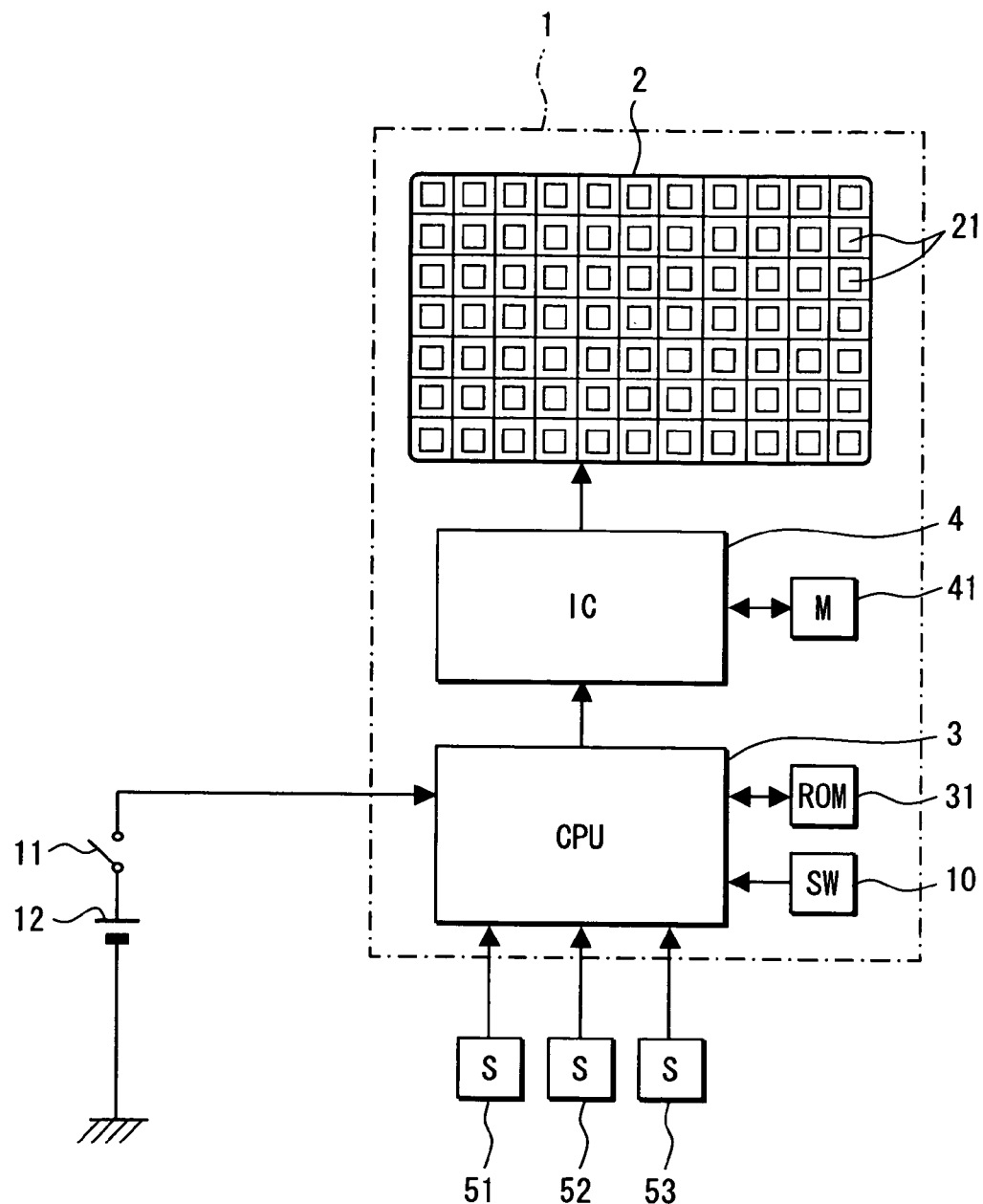
FIG. 1 is a circuit diagram showing a display unit.

FIG. 1 shows a display unit 1, which is suitably used for a vehicle. The unit 1 includes a liquid crystal panel 2 as a display panel, a CPU (i.e., central processing unit) 3 and an image IC 4 as a controller, a flash ROM 31 as a memory and an image memory 41 capable of rewriting memorized data.

The panel 2 has multiple pixels 21, which provide a matrix system. The panel 2 is an active matrix type liquid crystal panel, which is driven with a thin film transistor (i.e., TFT, not shown). Each pixel 21 has a red element, a green element and a blue element. By applying a voltage to a gate of the TFT, a voltage applied to each of the red, green and blue elements in the pixel 21 is controlled. Thus, the optical transmission rate of each of the red, green and blue elements is controlled. A light-emitting diode (not shown) for emitting white light is arranged behind the panel 2 so that the light-emitting diode illuminates the panel 2. The light-emitting diode transparently illuminates each pixel 21, which has the red, green and blue elements with controlled optical transmission rates, thereby, the panel 2 displays an image in full color.

The CPU 3 retrieves information such as the number of revolutions of an engine of a vehicle, a vehicle speed, indicator information and warning information from a rotation sensor 51, a speed sensor 52 and an indicator/warning sensor 53. Then, the CPU 3 inputs the information data to the image IC 4. The CPU 3 is energized by a battery 12 through an ignition switch 11 of the vehicle.

The rotation sensor 51 detects the number of revolutions of the engine, and the speed sensor 52 detects speed of the vehicle. The indicator/warning sensor 53 detects information related to an indicator or a warning element. The indicator shows operation conditions of equipment in the vehicle, and the warning element warns an abnormal condition of the vehicle.

Figure 2:
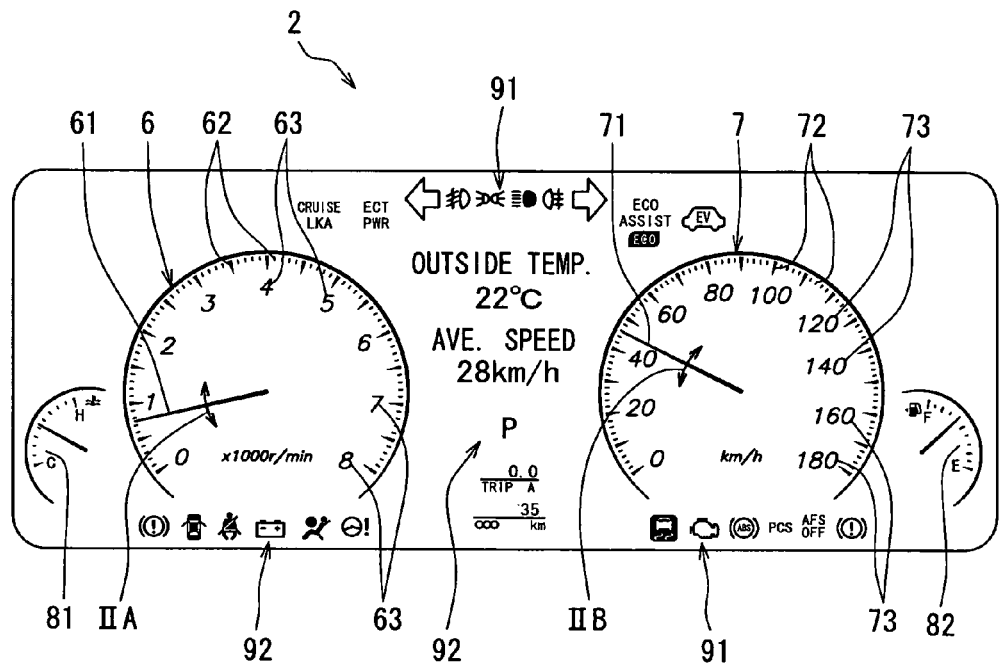
FIG. 2 is a front view showing a liquid crystal panel in the display unit.

The flash ROM 31 stores an image data element corresponding to a rotation meter image 6, an image data element corresponding to a speed meter image 7, and two image data elements corresponding to indicator/warning images 91, 92 and so on, as shown in FIG. 2.

The CPU 3 instructs to transfer the image data elements from the ROM 31 to the image memory 41. Further, the image IC 4 controls the voltage to be applied to each of the red, green and blue elements in each pixel 21, based on the image data elements stored in the image memory 41 and the information such as the number of revolutions of the engine, the vehicle speed and the indicator/warning information. Thus, displaying condition of each pixel 21 is controlled, thereby, the panel 2 displays multiple information such as the rotation meter image 6, the speed meter image 7, the indicator/warning images 91, 92 and the like.

The rotation meter image 6 shows the number of revolutions of the engine. The rotation meter image 6 includes a scale image 62 for providing a scale, a character image 63 for providing a character, and a pointer image 61 for providing a pointer to point the scale image 62 and the character image 63. The CPU 3 and the image IC 4 control to display the rotation meter image 6, based on the image data element corresponding to the rotation meter image 6 stored in the image memory 41 and the number of revolutions of the engine inputted in the CPU 3 so that the pointer image 61 rotates in a direction IIA along with the scale image 62 according to the number of revolutions of the engine. Thus, the rotation meter image 6 including the pointer image 61 can show the number of revolutions of the engine.

The speed meter image 7 shows the vehicle speed. The speed meter image 7 includes a scale image 72 for providing a scale, a character image 73 for providing a character, and a pointer image 71 for providing a pointer to point the scale image 72 and the character image 73. The CPU 3 and the image IC 4 control to display the speed meter image 7, based on the image data element corresponding to the speed meter image 7 stored in the image memory 41 and the vehicle speed inputted in the CPU 3 so that the pointer image 71 rotates in a direction IIB along with the scale image 72 according to the vehicle speed. Thus, the speed meter image 7 including the pointer image 71 can show the vehicle speed.

A water temperature meter image 81 shows temperature of engine cooling water in the vehicle, and a fuel meter image 82 shows remaining fuel in the vehicle. Similar to the rotation meter image 6 and the speed meter image 7, the water temperature meter image 81 can show the temperature of engine cooling water, and the fuel meter image 82 can show the remaining fuel.

The indicator/warning images 91, 92 show indicator information and warning information. Based on the image data element corresponding to the indicator/warning images 91, 92 memorized in the image memory 41, the indicator information and the warning information, the indicator/warning images 91, 92 are controlled. For example, according to the indicator information and the warning information, the indicator/warning images 91, 92 are displayed or not displayed. Alternatively, color of the indicator/warning image 91, 92 may be switched. Thus, the indicator/warning images 91, 92 can show the indicator information and the warning information, respectively.

Figure 3:
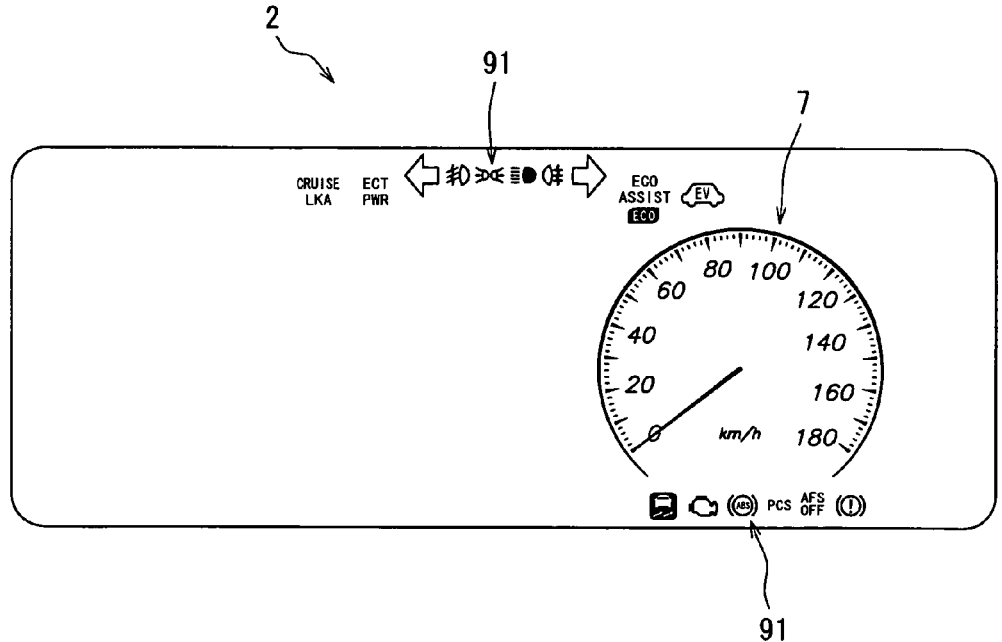
FIG. 3 is a front view showing the panel when the panel displays a speed meter image on ahead.

When the ignition switch 11 turns on, the battery 12 energizes the CPU 3 so that the CPU 3 functions. Thus, the display unit 1 starts to operate. At the time of starting, the CPU 3 transfers a part of image data elements such as the image data element corresponding to the speed meter image 7 and the image data element corresponding to the indicator/warning image 91 to the image memory 41 on ahead, i.e., immediately. Then, based on the speed meter image 7 and the indicator/warning image 91 stored in the image memory 41, and further based on the vehicle speed and the indicator and warning information corresponding to the indicator/warning image 91, which are input in the CPU 3, the CPU 3 and the image IC 4 instruct to display the speed meter image 7 and the indicator/warning image 91 on the panel 2 on ahead. Specifically, only the speed meter image 7 and the indicator/warning image 91 among multiple images of the rotation meter image 6, the speed meter image 7, the water temperature meter image 81, the fuel meter image 82, the indicator/warning image 91 and the indicator/warning image 92 are displayed on the panel 2 on ahead, as shown in FIG. 3.

Thus, since only the part of the images 7, 91 are displayed, the time interval from the start of the display unit 1 to the display of the images 7, 91 becomes shorter, compared with a case where all data elements corresponding to all images 6, 7, 81, 82, 91, 92 are transferred to the memory 41 so that all images 6, 7, 81, 82, 91, 92 are displayed on the panel 2 simultaneously. Thus, the time interval in which the display unit 1 displays nothing in case of starting of the display unit 1 can be shortened.

After the CPU 3 and the image IC 4 orders to display the speed meter image 7 and the indicator/warning image 91 on the panel 2 on ahead, the remaining image data elements corresponding to the images 6, 81, 82, 92 are transferred to the image memory 41. Then, based on the remaining image data elements in the image memory 41 and the number of revolutions and the indicator/warning information corresponding to the indicator/warning image 92, the CPU 3 and the image IC 4 control to display the rotation meter image 6, the water temperature meter image 81, the fuel meter image 82 and the indicator/warning image 92 on the panel 2. Thus, all information images are displayed on the panel 2.

Here, the speed meter image 7 and the indicator/warning image 91 represent higher priority information than the rotation meter image 6, the water temperature meter image 81, the fuel meter image 82 and the indicator/warning image 92. Specifically, the speed meter image 7 and the indicator/warning image 91 represent the important information in view of law. Thus, the important information from a legal standpoint can be noticed immediately.

Figure 4:
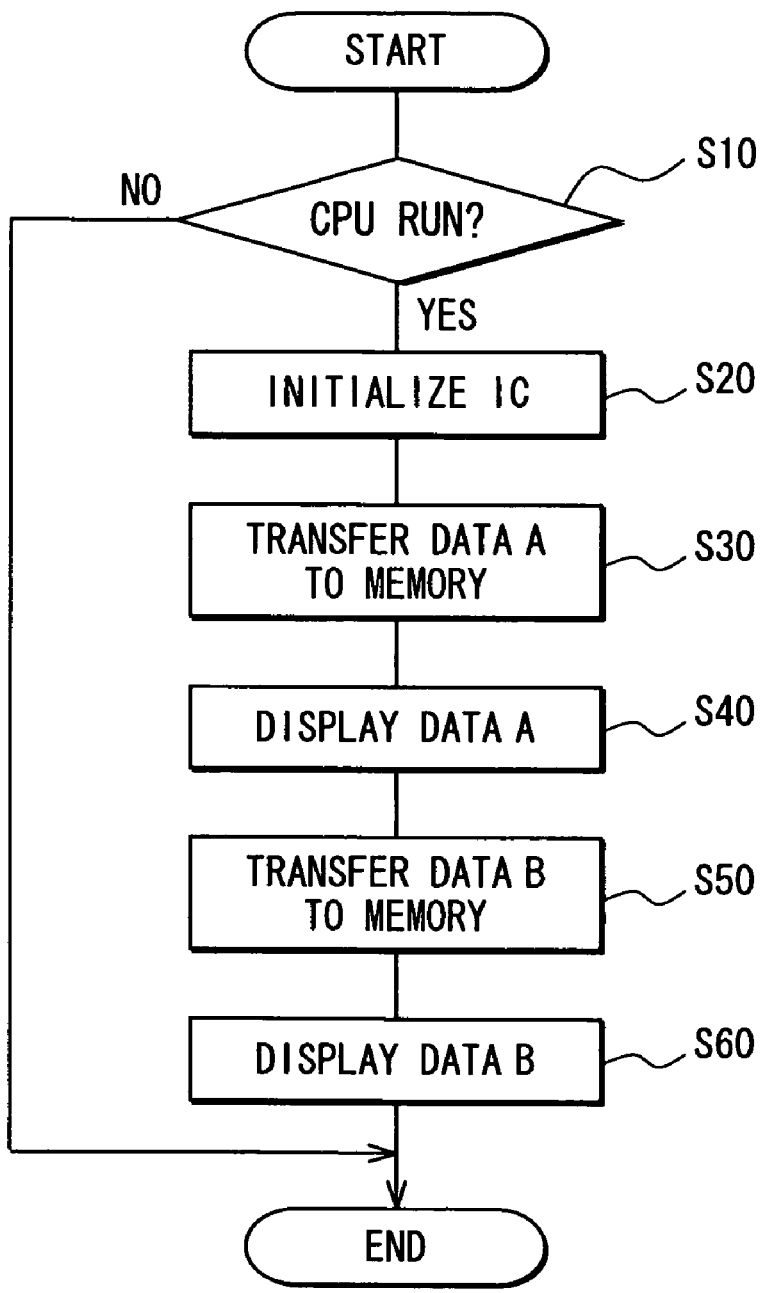
FIG. 4 is a flowchart showing a control process executed by a CPU.

When the display unit 1 starts to operate, the control process executed by the CPU 3 is shown in FIG. 4.

First, the ignition switch 11 turns on so that the control process starts. In Step S10, it is determined whether the CPU 3 runs or is activated. When it is determined "YES" in Step S10, i.e., when the CPU 3 is activated, in Step S20, the image IC 4 is initialized. Thus, Step S20 represents an initialization step.

After Step S20, in Step S30, a part of the image data elements corresponding to the speed meter image 7 and the indicator/warning image 91 is transferred to the image memory 41. That is, the high priority data elements A are transferred to the image memory 41. After Step S30, in Step S40, based on the part of the image data elements stored in the image memory 41 and further based on the vehicle speed information input in the CPU 3 and the indicator/warning information corresponding to the indicator/warning image 91, the speed meter image 7 and the indicator/warning image 91 are displayed on the panel 2 prior to the remaining images 6, 81, 82, 92. Thus, the high priority images corresponding to the data elements A are displayed on the panel 2.

After Step S40, in Step S50, the remaining image data elements corresponding to the rotation meter image 6, the water temperature meter image 81, the fuel meter image 82 and the indicator/warning image 92 are transferred to the image memory 41. Thus, the remaining data elements B are transferred to the image memory 41. After Step 50, in Step S60, based on the remaining data elements stored in the image memory 41 and further based on the information about the number of revolutions of the engine and the indicator/warning information corresponding to the indicator/warning image 92, the rotation meter image 6, the water temperature meter image 81, the fuel meter image 82 and the indicator/warning image 92 are displayed on the panel 2. Thus, the remaining images corresponding to the data elements B are displayed on the panel 2. Accordingly, in Steps S40, S60, all information images 6, 7, 81, 82, 91, 92 are displayed on the panel 2.

After Step S60, the control process ends. Further, when it is decided "NO" in Step S10, i.e., when it is determined that the CPU 3 is not activated, the control process ends.

The display unit 1 includes the liquid crystal panel 2, the flash ROM 31, the image memory 41, the CPU 3 and the image IC 4. The panel 2 is capable of displaying multiple information images such as the rotation meter image 6, the speed meter image 7, the water temperature meter image 81, the fuel meter image 82, and the indicator/warning images 91, 92. The flash ROM 31 stores multiple image data elements corresponding to the information images 6, 7, 81, 82, 91, 92. The image memory 41 stores the image data elements transferred from the flash ROM 31. Based on the image data elements stored in the image memory 41, the CPU 3 and the image IC 4 controls to display the information images 6, 7, 81, 82, 91, 92 on the panel 2. When the display unit 1 starts to operate, the CPU 3 and the image IC 4 transfer a part of the image data elements among multiple image data elements to the image memory 41 prior to the remaining image data elements. Based on the part of the image data elements, the part of the information images corresponding to the speed meter image 7 and the indicator/warning image 91 are displayed on the panel 2 prior to the remaining information images corresponding to the remaining image data elements. Thus, the time delay from the start of the display unit 1 to the display of the images is reduced.

The display unit 1 may further include a selection switch 10 for selecting the first information images (i.e., the part of the information images), which are displayed on the panel 2 on ahead. For example, the selection switch 10 as a push operation type switch is arranged near the panel 2. As shown in FIG. 2, under the condition where all information images 6, 7, 81, 82, 91, 92 are displayed on the panel 2, by operating the selection switch 10, the first information images are selected.

Here, when a user pushes the selection switch 10 in a short time, one of the information images is marked. By repeating to push the selection switch 10 in a short time, a marked image is changed. When the user pushes the switch 10 in a comparatively long time, the marked image is selected as the first information image as a prior display image so that the marked image is stored in a memory (not shown). This memory includes a nonvolatility memory or a backup RAM, which is capable of rewriting stored data therein.

Although the panel 2 is capable of displaying in full color, the panel 2 may display in monochrome.

Although the panel 2 is a light receiving type panel, i.e., although the panel 2 is a non-emitting type panel, the panel may be formed of a light emitting type panel such as an EL display panel.

Although the unit 1 includes the flash ROM 31, the unit 1 may include a conventional ROM.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A display unit comprising:
    a display panel for displaying a plurality of information images, which relate to each other;
    a memory for storing a plurality of image data elements corresponding to the information images;
    an image memory for storing the image data elements transferred from the memory; and
    a controller for controlling the display panel to display the information images based on the image data elements in the image memory, wherein
    the controller transfers a part of the image data elements to the image memory on ahead when the display unit starts to operate, and
    the controller controls the display panel to display a part of information images on ahead based on the part of the image data elements,
    the controller transfers a remaining part of the image data elements to the image memory after the display panel displays the part of information images on ahead, and the controller controls the display panel to display a remaining part of information images based on the remaining part of the image data elements.

2. The display unit according to claim 1, wherein
the plurality of information images includes a physical quantity information image, which represents physical quantity information,
the physical quantity information image includes a scale image for providing a scale and a pointer image for providing a pointer, and
the controller controls the display panel to display the physical quantity information image in such a manner that the pointer image is capable of moving along with the scale image.

3. The display unit according to claim 1, wherein
the part of the information images represents information having priority higher than the remaining part of the information images.

4. The display unit according to claim 1, further comprising:
a selector for selecting the part of the information images.

5. A display unit comprising:
a selector for selecting a first information image among a plurality of information images, wherein rest of the information images provides a second information image and the first information image and the second information image relate to each other;
a display panel for displaying the first information image and the second information image;
a first memory for storing a first image data element and a second image data element, wherein the first image data element corresponds to the first information image, and the second image data element corresponds to the second information image;
a second memory for storing the first and second image data elements transferred from the first memory, wherein the second memory provides an image memory; and
a controller for controlling the display panel to display the first and second information images based on the first and second image data elements in the second memory, wherein
the controller transfers the first image data element from the first memory to the second memory when the display unit starts to operate,
the controller controls the display panel to display the first information image corresponding to the first image data element,
the controller transfers the second image data element from the first memory to the second memory after the display panel displays the first information image, and
the controller controls the display panel to display the second information image in addition to the first information image corresponding to the second image data element.

6. A method for displaying a plurality of information images comprising:
selecting a first information image among the plurality of information images, wherein rest of the information images provides a second information image and the first information image and the second information image relate to each other;
storing a first image data element and a second image data element in a first memory, wherein the first image data element corresponds to the first information image, and the second image data element corresponds to the second information image;
transferring the first image data element from the first memory to a second memory after the selecting and the storing and when the displaying method starts to operate, wherein the second memory provides an image memory;
displaying the first information image corresponding to the first image data element on a display panel;
transferring the second image data element from the first memory to the second memory after the displaying the first information image; and
displaying the second information image in addition to the first information image corresponding to the second image data element on the display panel.

7. The display unit according to claim 1, wherein the display unit starts to operate upon activation of an ignition switch.

8. The display unit according to claim 5, wherein the display unit starts to operate upon activation of an ignition switch.

9. The method according to claim 6, wherein the displaying method starts to operate upon activation of an ignition switch.

10. The display unit according to claim 1,
wherein the part of information images includes a speed meter image and a indicator and warning image,
wherein the speed meter image has a scale image showing a scale and a pointer image rotatable along with the scale image according to a vehicle speed and pointing the scale image,
wherein the indicator and warning image has an indicator image notifying an operation condition of an in-vehicle device and a warning image notifying a warning,
wherein the remaining part of information images includes a engine rotation meter image, a water temperature meter image and a fuel meter image,
wherein each of the rotation meter image, the water temperature meter image and the fuel meter image includes a scale image showing a scale and a pointer image rotatable along with the scale image and pointing the scale image.

11. The display unit according to claim 1,
wherein the part of information images and the remaining part of information images provide a whole of a screen image of the display panel, and
wherein the remaining part of information images does not conceal the part of information images.

12. The display unit according to claim 5,
wherein the first information image includes a speed meter image and a indicator and warning image,
wherein the speed meter image has a scale image showing a scale and a pointer image rotatable along with the scale image according to a vehicle speed and pointing the scale image,
wherein the indicator and warning image has an indicator image notifying an operation condition of an in-vehicle device and a warning image notifying a warning,
wherein the second information image includes a engine rotation meter image, a water temperature meter image and a fuel meter image,
wherein each of the rotation meter image, the water temperature meter image and the fuel meter image includes a scale image showing a scale and a pointer image rotatable along with the scale image and pointing the scale image.

13. The display unit according to claim 5,
wherein the first information image and the second information image provide a whole of a screen image of the display panel, and wherein the second information image does not conceal the first information image.

14. The method according to claim 6,
wherein the first information image includes a speed meter image and a indicator and warning image,
wherein the speed meter image has a scale image showing a scale and a pointer image rotatable along with the scale image according to a vehicle speed and pointing the scale image,
wherein the indicator and warning image has an indicator image notifying an operation condition of an in-vehicle device and a warning image notifying a warning,
wherein the second information image includes a engine rotation meter image, a water temperature meter image and a fuel meter image,
wherein each of the rotation meter image, the water temperature meter image and the fuel meter image includes a scale image showing a scale and a pointer image rotatable along with the scale image and pointing the scale image.

15. The method according to claim 6,
wherein the first information image and the second information image provide a whole of a screen image of the display panel, and
wherein the second information image does not conceal the first information image.

16. A display unit comprising:
a display panel for displaying a plurality of information images, which relate to each other;
a memory for storing a plurality of image data elements corresponding to the information images;
an image memory for storing the image data elements transferred from the memory; and
a controller for controlling the display panel to display the information images based on the image data elements in the image memory, wherein
the controller transfers only a part of the image data elements to the image memory on ahead when the display unit starts to operate and not a remaining part of the image data elements, and
the controller controls the display panel to display a part of information images on ahead based on only the part of the image data elements and not the remaining part of the image data elements,
the controller transfers the remaining part of the image data elements to the image memory after the display panel displays the part of information images on ahead, and
the controller controls the display panel to display a remaining part of information images based on the remaining part of the image data elements.

17. A display unit comprising:
a selector for selecting a first information image among a plurality of information images, wherein rest of the information images provides a second information image and the first information image and the second information image relate to each other;
a display panel for displaying the first information image and the second information image;
a first memory for storing a first image data element and a second image data element, wherein the first image data element corresponds to the first information image, and the second image data element corresponds to the second information image;
a second memory for storing the first and second image data elements transferred from the first memory, wherein the second memory provides an image memory; and
a controller for controlling the display panel to display the first and second information images based on the first and second image data elements in the second memory, wherein
the controller transfers only the first image data element from the first memory to the second memory when the display unit starts to operate,
the controller controls the display panel to display the first information image corresponding only to the first image data element,
the controller transfers the second image data element from the first memory to the second memory after the display panel displays the first information image, and
the controller controls the display panel to display the second information image in addition to the first information image corresponding to the second image data element.

18. A method for displaying a plurality of information images comprising:
selecting a first information image among the plurality of information images, wherein rest of the information images provides a second information image and the first information image and the second information image relate to each other;
storing a first image data element and a second image data element in a first memory, wherein the first image data element corresponds to the first information image, and the second image data element corresponds to the second information image;
transferring only the first image data element from the first memory to a second memory after the selecting and the storing and when the displaying method starts to operate, wherein the second memory provides an image memory;
displaying the first information image corresponding to only the first image data element on a display panel;
transferring the second image data element from the first memory to the second memory after the displaying the first information image; and
displaying the second information image in addition to the first information image corresponding to the second image data element on the display panel.

* * * * *